Aug. 8, 1961 J. R. DAVENPORT 2,995,398
EXPANDABLE TRAILER

Filed Nov. 19, 1959 3 Sheets-Sheet 1

INVENTOR.
JAMES R. DAVENPORT
BY Alexander Riaboff
ATTORNEY

Aug. 8, 1961 J. R. DAVENPORT 2,995,398
EXPANDABLE TRAILER
Filed Nov. 19, 1959 3 Sheets-Sheet 2

INVENTOR.
JAMES R. DAVENPORT
BY Alexander Riaboff
ATTORNEY

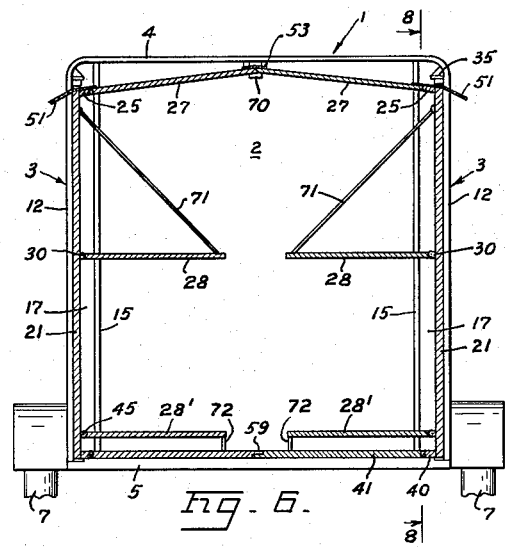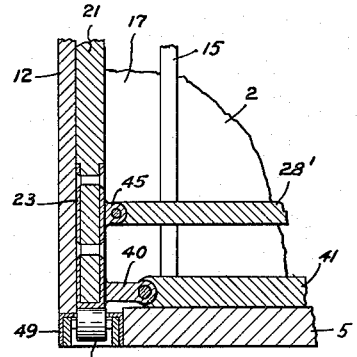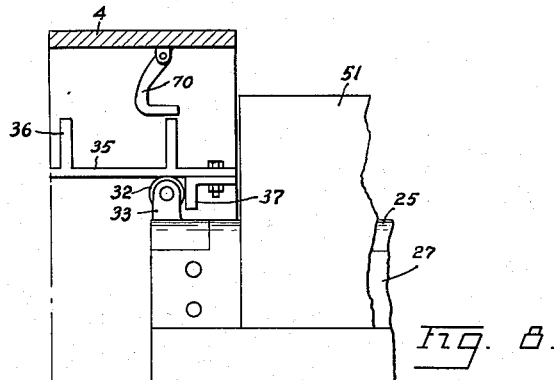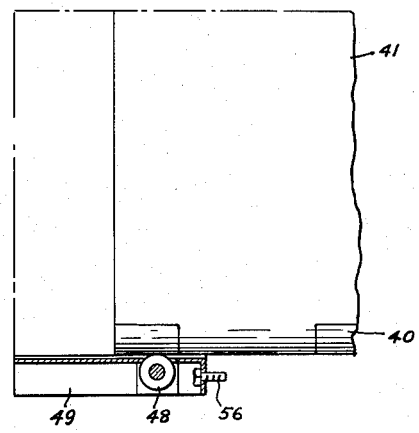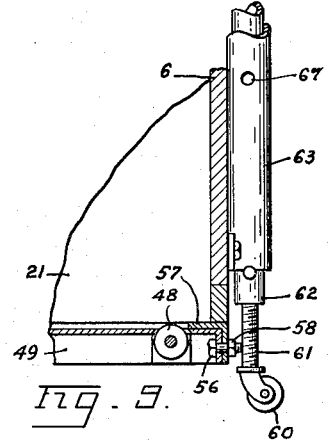
INVENTOR.
JAMES R. DAVENPORT
BY Alexander Riaboff
ATTORNEY United States Patent Office 2,995,398
Patented Aug. 8, 1961

2,995,398
EXPANDABLE TRAILER
James R. Davenport, 1364 Goetinger St.,
San Francisco, Calif.
Filed Nov. 19, 1959, Ser. No. 854,190
6 Claims. (Cl. 296—26)

This invention relates to an expandable trailer.

The primary object of this invention is to provide a trailer which may ordinarily be loaded with articles needed in travel, or goods of any kind, and which may be expanded without unloading or disturbing said articles, or goods inside of said trailer, to provide sleeping or living accommodations for several people.

Another object of the invention is to provide an expandable trailer consisting of a main unit, having double walled sides, and of a movable section having a back wall and side walls secured thereto and movable within said double walls so that said back wall, which normally closes the main unit, with said side walls, may be pulled out of the main unit. The side walls of the movable section each carry a half of the roof and a half of the floor folded thereon, which halves are thereupon unfolded to form the roof and the floor respectively.

Other objects and advantages will appear as the specification proceeds and the novel features of the device will be particularly pointed out in the claims hereto annexed.

In this specification and the annexed drawing, the invention is illustrated in the form considered to be the best but it is understood that the invention is not limited to such form; and it is also to be understood that in and by the claims following the description, it is desired to cover the invention in whatsoever form it may be embodied.

This invention is illustrated in the accompanying drawings forming a part of this invention, in which:

FIG. 6 is a vertical cross-section of the movable section taken along the line 6—6 of FIG. 2.

FIG. 7 is a vertical section of the left lower corner of the trailer as shown in FIG. 6.

FIG. 8 is a vertical longitudinal section of said trailer taken along the line 8—8 of FIG. 6, showing the trailer expanded but with the roof, floor and bed bunks in folded position, and FIG. 9 is a vertical cross-section of the back side and floor of the contracted trailer.

Figure 1:
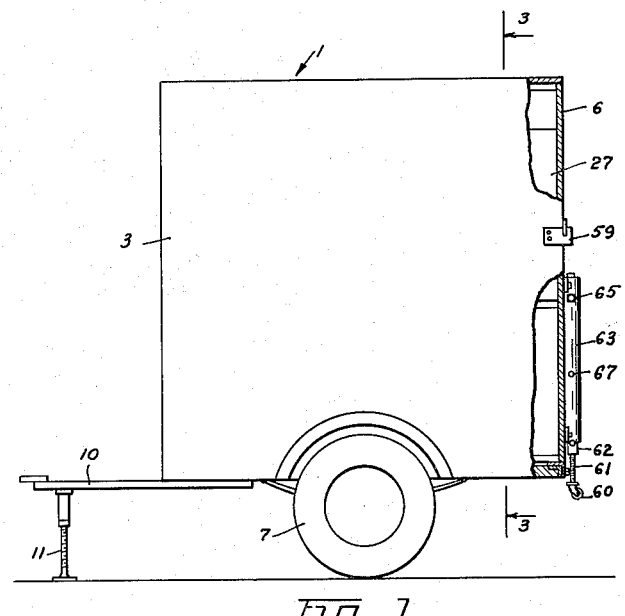
FIG. 1 is a side view of the trailer constructed in accordance with the teaching of this invention, part of the trailer being shown in section, said trailer being shown contracted.

The trailer comprising the subject matter of this invention comprises a main unit 1 and a movable section 20. The main section consists of a front wall 2, double walled sides 3, roof 4, and a floor 5 and closed by a back wall 6 of the movable section 20. The trailer is supported in a usual manner by a pair of wheels 7. The trailer is towed by a draw bar 10 secured to the main unit 1. If desired, a removable jack 11 may be provided under the draw bar 10 for supporting the front end of said trailer while the same is parked.

The double walled sides 3 are formed by outer sides 12 and partitions 15 arranged parallel to said outer sides and in spaced relation thereto to form long and narrow passages 17 therebetween. The partitions 15 extend from the floor 5 to the roof 4 and almost the entire length of the trailer, terminating only the thickness of the back wall 6 away from the very end of the trailer.

The movable section 20 of the trailer consists of side walls 21 which are slidably arranged in the passages 17 near the outer sides 12. The side walls 21 may be made of any suitable material, such as plywood, or aluminum alloy and may be supported, or reinforced, by a suitable frame. Preferably, said side walls have an inverted U-shaped channel 22 and a U-shaped channel 23 riveted or otherwise secured to the top and to the bottom thereof respectively. The upper channel 22 has attached thereto a hinge 25 extending outwardly from said side wall a certain distance, to which hinge one half of the roof 27 is swingably secured, as shown in detail in FIG. 4. The half of the roof 27 is normally folded downwardly parallel and in spaced relation to said side wall 21. Between said side wall 21 and the half of the roof 27 is folded upwardly a bunk 28, which is hinged at 30 to approximately the middle of said side wall. At the front end of said side wall 21 the channel 22 and the hinge 25 carry a roller 32 supported by ears 33 extending upwardly from the top of said channel and hinge. The roller 32 abuts a slide 35 secured to the side wall 12 directly and by supports 36 and extends the length of the passage 17. The roller 32 abutting the slide 35 keeps the side wall 21 level while the movable section is pulled out or pushed in. The outward movement of the movable section is stopped by a stop 37 secured to the underside of the slide 35 near the rear end of the trailer. The roller 32 contacts said stop 37 when the movable section is pulled out of the main unit to its outermost position.

The U-shaped bottom channel 23 is riveted, or otherwise secured, to the lower edge of the side wall 21, and has a hinge 40 secured to or integral with said channel. The hinge 40 extends some distance away from the channel 23 and carries swingably secured thereto a half of the floor 41. When folded the floor half extends upwardly and parallel to and some distance away from said wall. A bunk 28' is swingably secured between said side wall and said floor half by a hinge 45 secured to the bottom channel 23 above the hinge 40 and in close proximity thereto.

The lower edge of the side wall 21 rides on a roller 48 while the movable section is pulled out, or pushed in. The roller 48 is rotatably arranged in the rear end of a channel 49 extending under the side 3. The rear end of the channel 49 is depressed slightly in relation to the floor 5, as shown in FIG. 7, so that the top of the roller 48 is substantially level with said floor.

Figure 4:
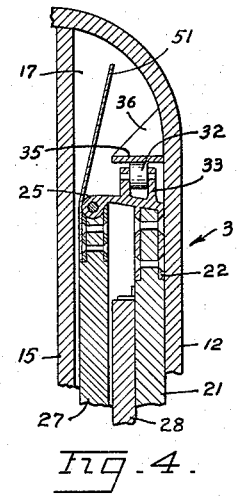
FIG. 4 is a vertical section of the right upper corner of the trailer, as shown in FIG. 3, showing the construction of the double side wall and the arrangement of the various parts of the movable section therein.
Figure 5:
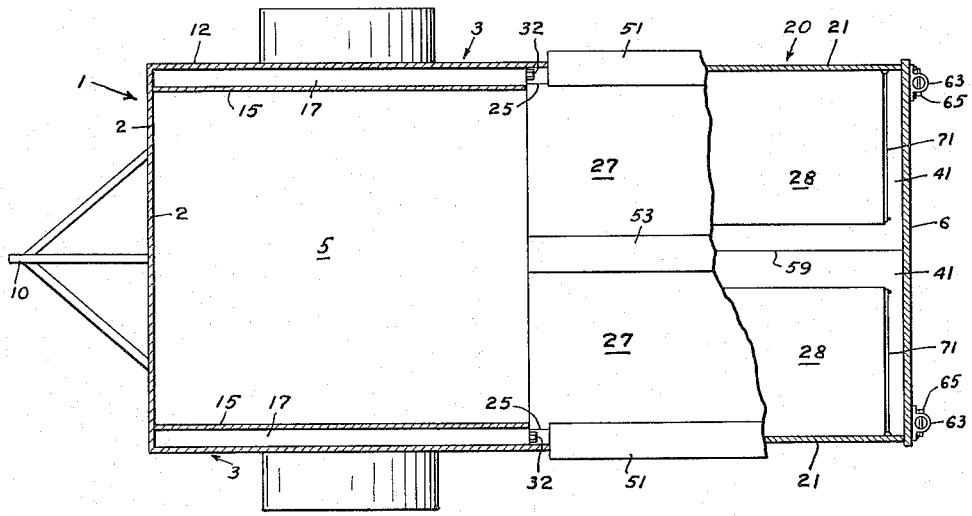
FIG. 5 is a horizontal section of the expanded trailer taken along the line 5—5 of FIG. 2, a part of it being shown in section.

In order to prevent the hinge 25 from leaking during rain the roof half 27 is provided with a shield 51 in form of a long narrow strip, preferably of metal, or plastic, which is secured to the roof part of the hinge 25. When the movable section is within the main unit 1, the shield 51 extends upwardly, as shown in FIG. 4. When the movable section is pulled out of the main unit, and the roof is properly arranged over the movable section, the shields 51 cover the hinges 25 and thus prevent rain from seeping into the section.

One of the roof halves 27 is provided with a central protecting strip 53 which is secured to the outer end of said half. When the roof is raised and properly arranged over the movable section, the strip 53 covers the joint of two halves 27, and thus helps to keep the movable section dry.

When it is desired to expand the trailer, the main unit 1 is first placed in substantially horizontal position by the jack 11 under the draw bar 10 and by a pair of jacks 55 under the rear end of said unit.

The movable unit is securely connected to the main unit by a pair of bolts 56 secured to the cross walls of the channels 49, which bolts pass through respective holes in a cross angle iron 57, supporting the back wall 6, and resting on the rear end of the floor of the main unit. The bolts 56 are secured therein by nuts 58. If desired, locking devices may also be provided on the sides 3 and the back wall 6 to securely hold them together, as shown at 59.

The back wall 6 is provided with two retractable caster wheels 60 carried by said wall in close proximity to its ends. Each wheel 60 is secured to the end of a threaded bar 61 screwed into a pipe 62. The latter is slidably arranged in a silde 63 fastened to the back wall 6.

The wheels 60 normally are retracted and held in retracted position by a locking bolt 65 passing through an upper hole 66 provided in the slide and through a hole in the pipe 62.

When it is desired to extend the trailer, the bolt 65 is taken out of the upper hole 66, whereupon the wheel 60 with the bar 61 and the pipe 62 drop down to the ground and the bolt 65 is placed through a lower hole 67, and through said hole in the pipe 62. If necessary, an adjustment may be made by rotating the wheel 60 with its bar 61 in relation to the pipe 62 so that the bolt 65 is easily passed through said holes while the wheel 60 rests on the ground.

Thereupon the movable section 20 is pulled out of the main unit 1. The rear end of said section rides on the wheels 60 while its side walls 21 slide on the rollers 48 until the upper rollers 32 strike the stops 37. Then the length of the bars 61 is adjusted to place the movable section in substantially horizontal position.

Then the floor halves are let down. The front end of the floor havles 41 rests on the rear end of the main unit while the rear end rests on the angle iron 57. The free ends of said halves are made to overlap each other as shown at 59. The roof halves 27 are raised and the right half, viewing FIG. 6, is lowered under the strip 53. The ends of the roof halves 27 are cut at an angle directed downwardly and to the right, viewing FIG. 6, so that the end of the right half is jammed between the bevelled end of the left half and the strip 54, thus securely holding the roof in place.

If desired, a swingable hook 70 may be provided on the ceiling of the main unit near the rear end thereof, so that the front end of the roof may be placed thereon.

Figure 2:
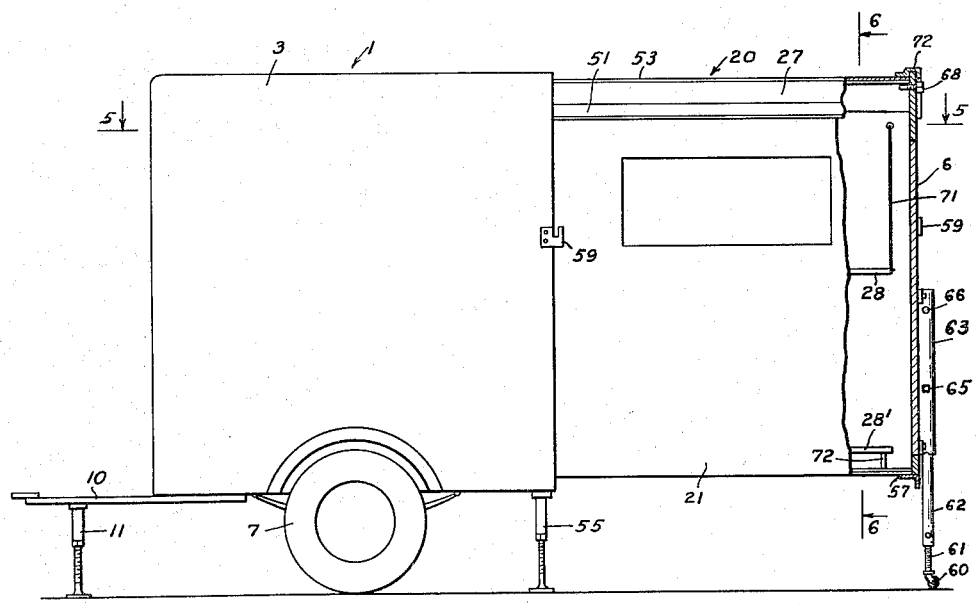
FIG. 2 is a side view of said trailer showing the same expanded, a part of the movable section being shown in section.
Figure 3:
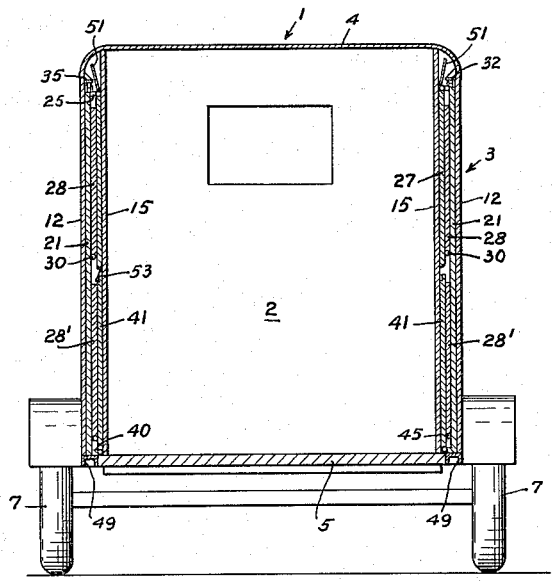
FIG. 3 is a vertical cross-section of the trailer along the line 3—3 of FIG. 1.

Two or more removable bolts 68 may be provided in the back wall 6 to support the rear end of the roof, as shown in FIG. 2. In order to prevent rain from leaking between said roof and the back wall a flexible plastic strip 72 is placed at the junction of said roof and wall, as shown in FIG. 2. Then the upper bunks 28 are lowered with their outer sides supported by straps 71, and the lower bunks 28' are lowered on supports 72, which may be foldably carried in said bunks.

I claim:

1. A trailer having a front wall, a floor, a roof and double walls on the sides forming the main unit, wheels for supporting the same, a movable unit consisting of a back wall normally closing the main unit, side walls secured to said back wall, a floor divided into two separate halves each half being hinged to the bottom of the adjoining side wall and foldable against the same, a roof divided into two separate halves, each half being hinged to the top of the adjoining side wall and foldable against the same, said side walls with the halves of said floor and roof folded thereagainst being slid into said double walls for contracting said trailer, said floor and roof halves forming the floor and the roof of the movable section when the trailer is expanded by moving said movable section out of the main unit, means for supporting said main unit, and means for supporting the movable section when the trailer is expanded.

2. A trailer as described in claim 1 and having means for stopping the outward movement of the movable section when the trailer is expanded to its maximum.

3. A trailer as described in claim 1, and having a roller in the main unit arranged under each side wall of the movable section for reducing friction between said walls and the main unit when the movable section is pulled out of the latter.

4. A trailer as described in claim 1, and having bunks hinged to the side walls of the movable section, said bunks being folded against said side walls between the same and the floor and roof halves, when the trailer is contracted.

5. A trailer as described in claim 1, and having a roller secured to the top of the front end of the side walls of the movable section, said main unit having a slide within each double wall against which the last mentioned roller rides when the movable section is pulled out or pushed in the main unit.

6. An expandable trailer comprising a main unit and a movable section adapted to move in and out of said main unit, the main unit including a floor, two parallel side walls on said floor, a front wall extending from one side wall to the other, and a roof extending from one side wall to the other and from the front wall to the back ends of said side walls, said movable section including two side walls slidable in the main unit, a back wall secured to the back ends of said side walls of said movable section for closing the main unit when the movable section is within the main unit, a floor consisting of two separate halves, each half being hinged to the bottom of the adjoining side wall of the movable section, and a roof consisting of two separate halves, each half being hinged to the top of the adjoining side wall of the movable section, said floor halves and roof halves being folded against the inner sides of said adjoining side walls when the movable section is inside of the main unit, and forming the floor and the roof of said movable section when the latter is pulled out to expand the trailer; and a means for supporting said main unit, and a means for supporting the movable section when the trailer is expanded.

References Cited in the file of this patent

UNITED STATES PATENTS

| | | |
|---|---|---|
| 2,177,394 | Pierce | Oct. 24, 1939 |
| 2,898,144 | Ferrera | Aug. 4, 1959 |
| 2,901,282 | Meaker | Aug. 25, 1959 |

FOREIGN PATENTS

| | | |
|---|---|---|
| 53,167 | Austria | Aug. 13, 1890 |